C. W. SEELEY & C. S. ROSS.
WHEEL.
APPLICATION FILED JAN. 2, 1912.

1,042,487.

Patented Oct. 29, 1912.
2 SHEETS—SHEET 1.

Witnesses.
E. R. Peland
C. Severance

Inventors.
Charles W. Seeley &
Charles S. Ross.

Attys.

C. W. SEELEY & C. S. ROSS.
WHEEL.
APPLICATION FILED JAN. 2, 1912.

1,042,487.

Patented Oct. 29, 1912.

2 SHEETS—SHEET 2.

Witnesses.

Inventors.
Charles W. Seeley
Charles S. Ross.

Attys.

UNITED STATES PATENT OFFICE.

CHARLES W. SEELEY AND CHARLES S. ROSS, OF HOLLYWOOD, CALIFORNIA.

WHEEL.

1,042,487.

Specification of Letters Patent.

Patented Oct. 29, 1912.

Application filed January 2, 1912. Serial No. 668,857.

*To all whom it may concern:*

Be it known that we, CHARLES W. SEELEY and CHARLES S. ROSS, citizens of the United States, residing at Hollywood, in the county of Los Angeles and State of California, have invented new and useful Improvements in Wheels, of which the following is a specification.

This invention relates to improvements in wheel constructions, and it is the object of the invention to provide a hub and shaft construction on which the rim and spokes of a wheel may be properly secured and cabled or ropes designed to be wound upon the said shaft may be properly secured to the said shaft and hub.

Hitherto in wheel constructions and particularly in those types of wheels used in the drilling of oil wells, commonly known as "bull wheels" and "calf wheels" octagonal wooden shafts have been employed, the spokes being spiked to the surface of the shaft. The constant wear of the cable, pull ropes and brakes, loosens the rims, splits the wood and renders the wheel useless in a short time. By means of the improved hub construction contemplated in the present invention these troubles are largely obviated and the rims can be quickly removed when broken and new ones substituted therefor in a short space of time.

The present invention constitutes an improvement of our invention set forth in Patent No. 981,128 issued Jan. 10, 1911.

It is a further object of the invention to provide a wheel for use as a "calf wheel" for oil well mechanisms in which the shaft and the hub portion of the wheel are well adapted for the securing of lagging in position on said shaft and upon the hub of the wheel so as to prevent the metallic parts thereof from wearing the pull cables or other cables employed.

Figure 6:
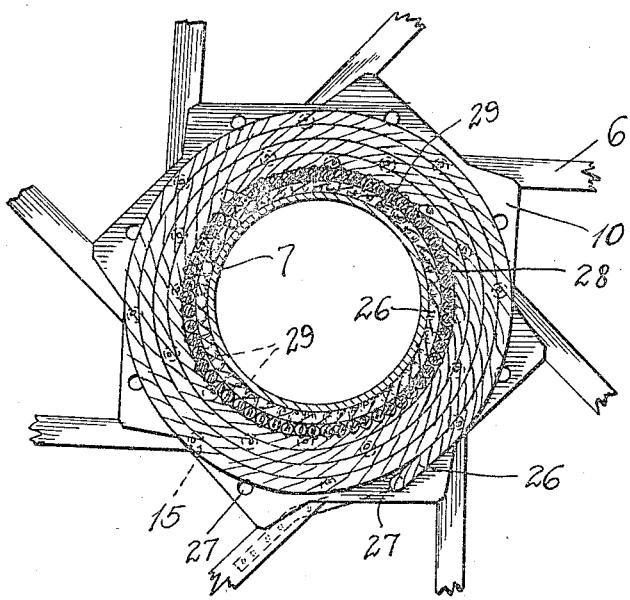
Figure 7:
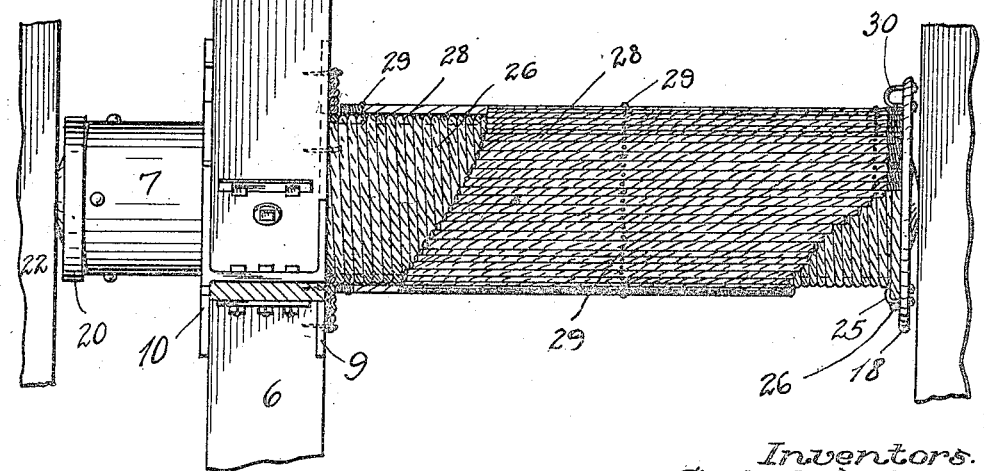

In the accompanying drawing forming a part of this specification, Figure 1 is a side elevation of a calf wheel constructed in accordance with the present invention. Fig. 2 is a front elevation of a wheel mounted in bearings, portions being broken away for clearness in illustration. Fig. 3 is a detail sectional view taken upon the line 3—3 of Fig. 1. Fig. 4 is a detail sectional view taken upon the line 4—4 of Fig. 1. Fig. 5 is a side elevation of one of the shaft bearings. Fig. 6 is a side elevation of the hub portion of the wheel showing the spiral windings of the lagging rope employed on the wheel and the manner of securing the same to the rope. Fig. 7 is a detail view partially in side elevation and partially in section of a calf wheel and the shaft therefor showing the lagging secured thereto.

The details and features of the invention will now be more particularly described, reference being had to the said drawing in which 5 indicates the rim of a calf wheel of usual construction and having attached thereto in a suitable manner spokes 6. The hub 8 is mounted on a hollow shaft 7 and has a cylindrical portion mounted thereon at any desired point along the length of the shaft. The said cylindrical hub 8 is formed with outwardly extending flanges 9 and 10 upon its ends forming a deep annular channel extending around the hub adapted to receive the inner ends of the spokes 6. Between the said flanges 9 and 10 extend tangentially arranged partitions 11 which are preferably formed integral with the said hub and the said flanges 9 and 10. Spoke receiving seats are formed between the flanges by the partitions 11 and the hub in the acute angles formed by the same. The inner ends of the spokes 6 are fitted into the angular seats afforded between the said partitions 11 and the hub 8 as clearly shown in Fig. 1 of the drawing, and the said spokes extend outwardly from said seats parallel with the partitions 11 against which they rest and to which they are secured by means of bolts 12. The said partitions 11 are offset with respect to the hub 8 so as to form the seats for the spokes upon one side and so as to afford recesses 13 upon the other sides thereof to permit of the insertion of securing bolts or screws 14. The said screws are usually in the form of bolts having angular heads by which they may be turned and engage screw threaded apertures formed in the hub 8 and the shaft 7 within it. The recesses 13 are of ample size to permit of the turning of the angular heads of said bolts. The flanges 9 and 10 are provided with a series of apertures 15 which are in alinement with the edges of the spokes 6 and afford openings through which nails may be driven for securing the ends of the cables or ropes which are wound upon the shaft 7 to form lagging thereon.

The hollow cylindrical shaft 7 is provided with trunnions 16 and 17, one at each end thereof and rigidly secured thereto by any suitable means. Trunnion 16 is provided with a flange 18 which prevents the cable, which is wound upon the shaft 7, from contacting with the adjacent bearing post 9. Metal bands 20 are shrunk on so as to maintain the trunnions in immovable relation to the shaft. The said trunnions are revolubly mounted in journal boxes 21, secured in a suitable manner in the bearing posts 19 and 22, each box having an oil way 23, which communicates with cavities 24 formed by the ends of the trunnions and the bottom of the recess boxes. These boxes are generally provided with babbitted linings.

The formation of the shaft 7, with the flanged trunnion 16 at one end and the wheel near the other end thereof, with the peculiar structure of its hub and the mounting of its spokes as above described, affords means for properly securing lagging and cushioning means upon the said shaft 7, which is found needful when employing a metallic shaft and for the winding in of wire or steel cables. Without such lagging and packing material the cable will be rapidly worn out. The structure of the present device is especially well adapted for protecting the cable or pulling lines which may be employed in connection with oil well mechanism.

The shaft 7 is first wound spirally with a cable usually of hemp, one end of which is adapted to be secured to the flange 18 of the trunnion 16 by means of a clip 25, which clip is arranged quite close to the band 20 and the shaft 7 as clearly seen in Fig. 2. The cable as 26 is wound closely in spiral form upon the said shaft 7 until it reaches the hub 8 of the calf wheel, after which it is wound outwardly in spiral form so as to lie flat against the inner flange 9 of the hub 8. Wherever the laps of the coil 6 formed pass over the apertures 15, the cable is secured by driving nails through the same and through the said apertures into the spokes 6. In this manner as will be evident from Fig. 6 in the drawing the cable can be strongly secured in position and the outer end thereof may be carried through outer apertures as 27, formed in the flanges of the hub 8 and then bent to one side against one of the spokes 6 and nailed thereto as shown in Fig. 6. The ends of this wound cable are thus firmly secured to the shaft by means of the clip 25 at one end and the nails passing through the flange of the hub on the calf wheel at the other end. In order to render the surface thus provided upon the shaft, suitable for receiving the line cables which are to be wound upon the shaft, longitudinally extending lagging cables 28 are provided, they usually being cut of a proper length to just fit between the flange 18 and the flange 9 of the hub. The ends of these lagging cables may be wound with twine to prevent their fraying if desired. The lagging cables 28 are laid side by side entirely around the shaft 7 so as to cover the spiral windings beneath and prevent the line cables from sinking between the same. The lagging cables 28 are usually nailed as for instance by nails 29 to the inner cable 26 at two, three or more points along their length, the ends of the nails being clenched inside the cable 26 against the said shaft 27. The flange 18 of the shaft is also provided with a second clip 30 for securing the end of the pull or other cables which are to be wound upon the shaft.

In a bull wheel structure, two sets of hubs 8 are placed upon the shaft 7, they being made of the same construction as herotofore described, and instead of fastening the lagging cables to the flange 18 their ends are merely nailed to the spokes through the apertures 15 at each end of the lagging as will be readily understood.

What we claim is:

1. A wheel construction comprising a hollow shaft having a flange near one end, securing means carried by said flange for securing a rope, a rope forming lagging and secured to said flange, a wheel mounted upon said shaft and having a hub formed with apertured flanges, the apertures therein being opposite the spokes of the wheel, spokes mounted between said flanges and in alinement with the apertures thereof, the said spokes affording means to which the rope of the lagging may be nailed for securing it, the nails being passed through said apertures, a rim carried by said spokes, and means for securing the hub to the said shaft.

2. A wheel construction comprising a shaft, a hub adapted to be mounted thereon having flanges extending outwardly from its ends, partitions being provided in tangential arrangement between the said flanges, spoke receiving seats being formed between said partitions and the hub upon one side, a bolt accommodating recess being formed upon the other side, of each partition, bolts adapted to be inserted in said recesses for securing the hub to the said shaft, spokes inserted between said hub flanges and having means for securing them to the partitions between said flanges, a rim carried by said spokes, the said flanges having apertures formed therein opposite the edges of said spokes to receive fastening means for the lagging rope, coiled lagging rope wound upon the shaft and secured by fastener means passed through the said apertures, and means carried by the said shaft for further securing the said rope.

3. A wheel construction comprising a shaft having a flange projecting therefrom, a wheel proper mounted on the shaft, a hub for said wheel having securing means thereon for fastening the spokes of the wheel thereto, the said hub having spoke engaging flanges with apertures therein, lagging rope wound upon said shaft and secured at one end to said securing flange, the other end of said rope being coiled upon the flange of said hub and secured to the spokes of the wheel, and longitudinally arranged lagging secured to said wound lagging.

4. A wheel construction for well boring apparatus, comprising a metallic shaft, a wheel proper mounted thereon having a metallic hub, lagging for cushioning line cables that are to be wound upon said shaft, comprising an inner winding of rope, a clamp for holding one end thereof to the said shaft, the other end being nailed to the said wheel, and a series of longitudinally extending lagging ropes nailed to the said wound rope and forming a supporting surface for the line cable to be wound thereon.

In witness that we claim the foregoing we have hereunto subscribed our names this 23rd day of December, 1911.

C. W. SEELEY.
C. S. ROSS.

Witnesses:
 EDMUND A. STRAUSE,
 EARLE R. POLLARD.